(12) United States Patent
Miyaji

(10) Patent No.: US 9,807,265 B2
(45) Date of Patent: Oct. 31, 2017

(54) USER-ADAPTIVE IMAGE FORMING APPARATUS

(71) Applicant: KYOCERA Document Solutions Inc., Osaka-shi, Osaka (JP)

(72) Inventor: Hikaru Miyaji, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/193,129

(22) Filed: Jun. 27, 2016

(65) Prior Publication Data

US 2017/0006174 A1   Jan. 5, 2017

(30) Foreign Application Priority Data

Jun. 30, 2015   (JP) ................. 2015-131388

(51) Int. Cl.
*H04N 1/00* (2006.01)

(52) U.S. Cl.
CPC ..... *H04N 1/00509* (2013.01); *H04N 1/00005* (2013.01); *H04N 1/0048* (2013.01); *H04N 1/00082* (2013.01); *H04N 1/00204* (2013.01); *H04N 1/00251* (2013.01); *H04N 1/00352* (2013.01); *H04N 1/00543* (2013.01); *H04N 1/00854* (2013.01); *H04N 1/00875* (2013.01); *H04N 1/00925* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

2002/0030831 A1*   3/2002   Kinjo ................ G06T 5/00
                                             358/1.9

FOREIGN PATENT DOCUMENTS

JP   2009229628 A   10/2009

* cited by examiner

*Primary Examiner* — Thomas D Lee

(57) ABSTRACT

An image forming apparatus has an image forming unit, a receiving unit, a discrimination unit, and a mode setting unit. The image forming unit forms an image on paper based on image data in either a first mode or a second mode in which image formation is more reliably performed than in the first mode. The receiving unit receives an image formation request from a user. The discrimination unit discriminates whether the user requesting image formation by the receiving unit is a first user or a second user who is less skilled in an operation of the image forming apparatus than the first user. When the discrimination unit discriminates that the user requesting image formation is the second user, a mode setting unit sets the mode to the second mode to operate the image forming unit.

18 Claims, 8 Drawing Sheets

USER-ADAPTIVE IMAGE FORMING APPARATUS

INCORPORATION BY REFERENCE

The disclosure of Japanese Patent Application No. 2015-131388 filed on Jun. 30, 2015 including the specification, drawings and abstract is incorporated herein by reference in its entirety.

BACKGROUND

The disclosure relates to an image forming apparatus.

In an image forming apparatus typified by a multifunctional peripheral, an image of a document is read by an image reading unit, and then a photoconductor provided in an image forming unit is irradiated with light based on the read image to form an electrostatic latent image on the photoconductor. Thereafter, a developing agent, such as a charged toner, is supplied onto the formed electrostatic latent image to form a visible image, the visible image is transferred and fixed to paper, and then the paper is discharged to the outside of the apparatus.

Some image forming apparatuses are configured so that non-skilled users unfamiliar with the operation of the image forming apparatuses can easily operate the image forming apparatuses by displaying a guidance screen relating to a basic operation. Techniques relating to the image forming apparatuses displaying the guidance screen are known heretofore.

SUMMARY

According to one aspect of the disclosure, an image forming apparatus is an image forming apparatus forming an image on paper. The image forming apparatus has an image forming unit, a receiving unit, a discrimination unit, and a mode setting unit. The image forming unit forms an image on paper based on image data in either a first mode or a second mode in which image formation is more reliably performed than in the first mode. The receiving unit receives an image formation request from a user. The discrimination unit discriminates whether the user requesting image formation by the receiving unit is a first user or a second user who is less skilled in the operation of the image forming apparatus than the first user. When the discrimination unit discriminates that the user requesting image formation is the second user, the mode setting unit sets the mode to the second mode to operate the image forming unit.

DETAILED DESCRIPTION

Figure 1:
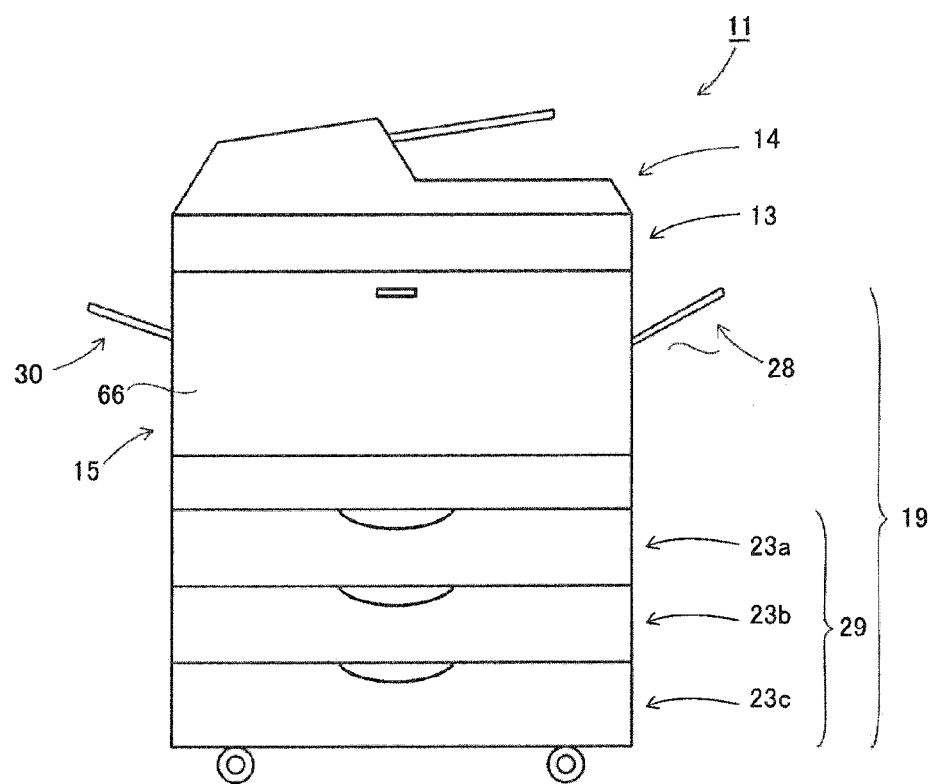
FIG. 1 is a schematic view illustrating the appearance of a multifunctional peripheral when an image forming apparatus according to one embodiment of the disclosure is applied to the multifunctional peripheral.
Figure 2:
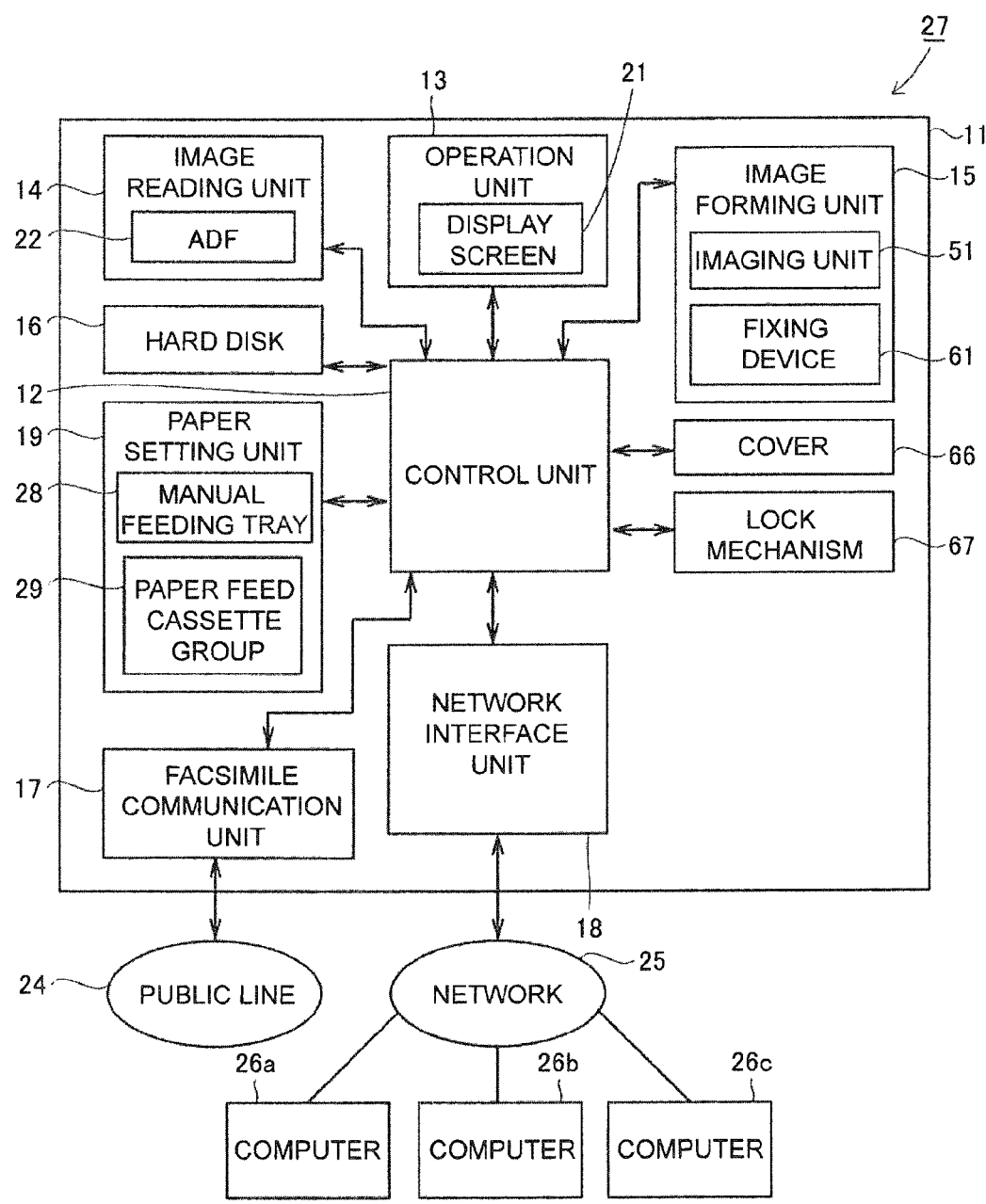
FIG. 2 is a block diagram illustrating the configuration of the multifunctional peripheral illustrated in FIG. 1.

Hereinafter, an embodiment of the disclosure is described. FIG. 1 is a schematic view illustrating the appearance of a multifunctional peripheral when an image forming apparatus according to one embodiment of the disclosure is applied to the multifunctional peripheral. FIG. 2 is a block diagram illustrating the configuration of the multifunctional peripheral illustrated in FIG. 1.

With reference to FIG. 1 and FIG. 2, a multifunctional peripheral 11 according to one embodiment of the disclosure has a control unit 12 (also referred to as a "controller"), an operation unit 13, an image reading unit 14, an image forming unit 15 (also referred to as a "image former"), a paper setting unit 19, a discharge tray 30, a hard disk 16 as a storage unit, a facsimile communication unit 17, and a network interface unit 18 for connection with a network 25.

The control unit 12 controls the entire multifunctional peripheral 11. The operation unit 13 contains a display screen 21 which displays information sent from the multifunctional peripheral 11 side and contents input from a user. The operation unit 13 allows a user to input image formation conditions, such as the number of print copies and gradation, or ON or OFF of a power supply. The image reading unit 14 contains an ADF (Auto Document Feeder) 22 as a document conveying device which conveys a document set to a set position to a reading position. The image reading unit 14 reads an image of a document set on the ADF 22 or a mounting table which is not illustrated. The paper setting unit 19 contains a manual feeding tray 28 to which paper is manually set and a paper feed cassette group 29 capable of storing a plurality of paper sheets different in size. The paper setting unit 19 is configured to allow a user to set paper as a recording medium to be supplied to the image forming unit 15. The image forming unit 15 forms an image on conveyed paper based on an image read by the image reading unit 14 or image data transmitted through the network 25. The image forming unit 15 forms an image on paper based on image data in either a first mode or a second mode in which image formation is more reliably performed on paper than in the first mode. The first mode is a so-called image formation mode with a usual linear velocity. The second mode is a mode of a so-called image formation mode with a lower linear velocity than the linear velocity of the first mode. Paper on which an image is formed by the image forming unit 15 is discharged as an output substance to the discharge tray 30. The hard disk 16 stores the transmitted image data, the input image formation conditions, and the like. The facsimile communication unit 17 is connected to a public line 24 and performs facsimile transmission and facsimile reception.

The multifunctional peripheral 11 has a DRAM (Dynamic Random Access Memory) which writes and reads-out image data and the like but the illustration and a description thereof is omitted. The arrows in FIG. 2 indicate the flow of control signals and data on control and images. As illustrated in FIG.

1, the paper feed cassette group 29 is configured from three paper feed cassettes 23a, 23b, and 23c in this embodiment.

The multifunctional peripheral 11 operates as a copying machine by forming an image in the image forming unit 15 using image data of a document read by the image reading unit 14. The multifunctional peripheral 11 operates as a printer by forming an image in the image forming unit 15, and then printing the image on paper using image data transmitted from computers 26a, 26b, and 26c connected to the network 25 through the network interface unit 18. More specifically, the image forming unit 15 operates as a printing unit which prints a requested image. The multifunctional peripheral 11 operates as a facsimile device by forming an image in the image forming unit 15 through the DRAM using image data transmitted from the public line 24 through the facsimile communication unit 17 or by transmitting image data of a document read by the image reading unit 14 to the public line 24 through the facsimile communication unit 17. The multifunctional peripheral 11 has a plurality of functions, such as a copy function, a printer function, and a facsimile function, about image processing. Furthermore, the multifunctional peripheral 11 has functions which allow detailed settings for each function.

An image formation system 27 having the multifunctional peripheral 11 according to one embodiment of the disclosure has the multifunctional peripheral 11 of the configuration described above and the plurality of computers 26a, 26b, and 26c connected to the multifunctional peripheral 11 through the network 25. In this embodiment, three computers are illustrated as the plurality of computers 26a to 26c. Each of the computers 26a to 26c can perform printing by performing a print request through the network 25 to the multifunctional peripheral 11. Configurations may be acceptable in which the multifunctional peripheral 11 and the computers 26a to 26c are connected through wire using a LAN (Local Area Network) cable or the like or are connected by radio and another multifunctional peripheral and a server are connected in the network 25.

Figure 3:
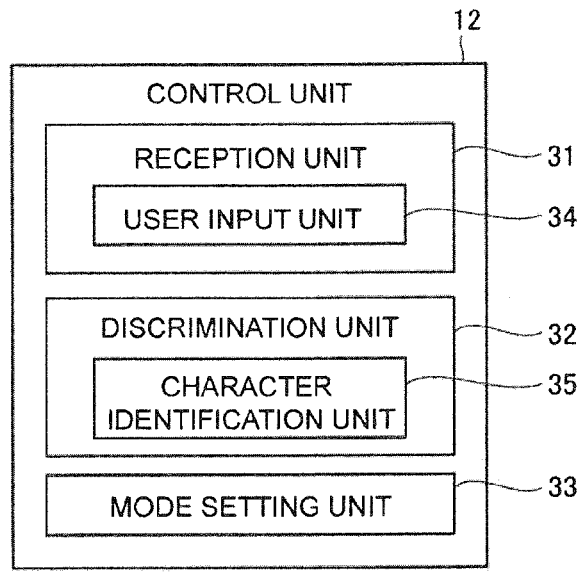
FIG. 3 is a block diagram illustrating the configuration of a control unit.

Next, a description of the configuration of the control unit 12 described above is given. FIG. 3 is a block diagram illustrating the configuration of the control unit 12. With reference to FIG. 1 to FIG. 3, the control unit 12 has a receiving unit 31 (also referred to as a "receiver"), a discrimination unit 32 (also referred to as a "discriminator"), and a mode setting unit 33 (also referred to as a "mode setter").

The receiving unit 31 receives an image formation request by the image forming unit 15. The receiving unit 31 has a user input unit 34 (also referred to as a "user inputter") which allows a user who performs operation to input whether the user is a first user or a second user utilizing the display screen 21.

The discrimination unit 32 discriminates whether a user requesting image formation by the receiving unit 31 is a first user or a second user who is less skilled in the operation of the multifunctional peripheral 11 than the first user. The discrimination unit 32 discriminates whether the user is the first user or the second user from information input by the user input unit 34.

The discrimination unit 32 contains a character identification unit 35 (also referred to as a "character identifier") which identifies characters out of image data. The discrimination unit 32 estimates whether the user is the first user or the second user from the characters identified out of image data. Specifically, when the proportion of plain words occupying the identified characters by the character identification unit 35 is higher than a predetermined proportion, e.g., 80%, the discrimination unit 32 estimates that the user requesting image formation by the receiving unit 31 is the second user. Herein, the plain words refer to easy English words and words formed from short texts and mean words which can be understood even by children.

When the user requesting image formation is discriminated as the second user by the discrimination unit 32, the mode setting unit 33 sets the mode to the second mode to operate the image forming unit 15. On the other hand, when the user requesting image formation is discriminated as the first user by the discrimination unit 32, the mode setting unit 33 sets the mode to the first mode to operate the image forming unit 15. More specifically, the mode setting unit 33 sets the mode to either the first mode or the second mode to operate the image forming unit 15.

Figure 4:
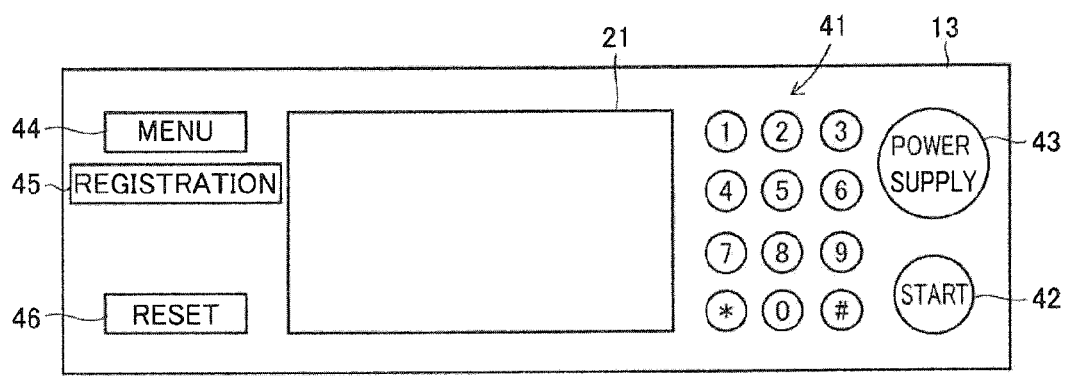
FIG. 4 is an outside view illustrating the schematic configuration of an operation unit.

Next, the above-described configuration of the operation unit 13 is described in more detail. FIG. 4 is an outside view illustrating a schematic configuration of the operation unit 13. With reference to FIG. 4, the operation unit 13 contains a ten key 41 which allows a user to input the numbers from 0 to 9 for inputting the number of print copies and the like and for inputting signs of "*" and "#", a start key 42 which allows a user to instruct the start of printing or the start of facsimile transmission, a power supply key 43 which allows a user to input ON or OFF of the power supply of the multifunctional peripheral 11, a menu key 44 which allows a user to instruct the selection of a printer function, a copy function, and the like of the multifunctional peripheral 11, a registration key 45 which allows a user to instruct the registration of various image formation conditions and a user, a reset key 4 which allows a user to cancel the instruction contents input using the ten key 41 and the like by a user, and the above-described display screen 21. The display screen 21 has a liquid crystal touch panel function, which allows a user to input image formation conditions and the like and to select functions also from the display screen 21 by press with a finger of the user.

Figure 5:
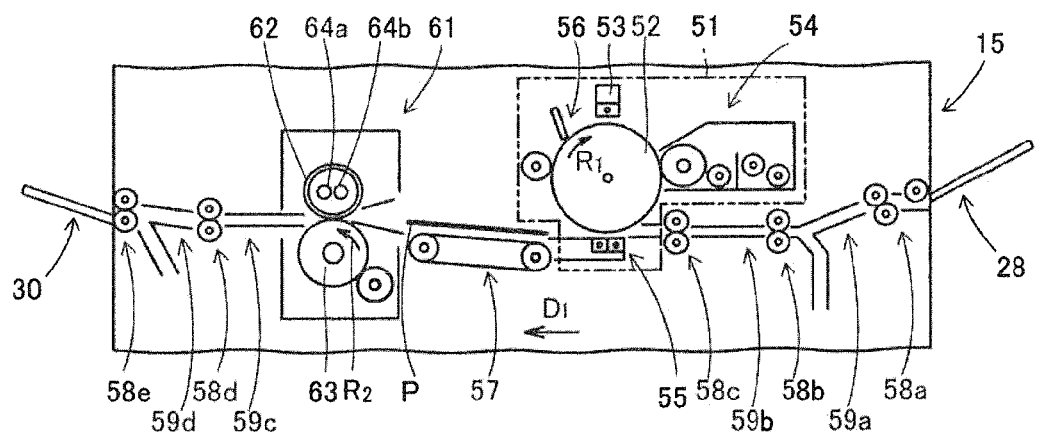
FIG. 5 is a schematic view illustrating the configuration of an image forming unit.

Next, the configuration of the image forming unit 15 provided in the multifunctional peripheral 11 is described. FIG. 5 is a view illustrating the configuration of the image forming unit 15 contained in the multifunctional peripheral 11 according to one embodiment of the disclosure.

With reference to FIG. 1 to FIG. 5, the image forming unit 15 has an imaging unit 51 which forms a visible image with a developing agent, specifically a toner, and then transfers the visible image to a paper P. The imaging unit 51 indicated by the chain double-dashed line in FIG. 5 contains a photoconductor 52 on the surface of which an electrostatic latent image is formed, a charging unit 53 which charges the surface of the photoconductor 52, a development unit 54 which is charged with a developing agent, contains a development sleeve and a plurality of stirring rollers, and supplies a developing agent to the surface of the photoconductor 52 on which the electrostatic latent image is formed to form a visible image, a transfer unit 55 which contains a transfer charger or a separation charger and transfers the visible image formed on the surface of the photoconductor 52 to the conveyed paper P, and a cleaning unit 56 which contains a static eliminating roller, a cleaning blade, and the like and removes the developing agent, residual charges, and the like remaining on the surface of the photoconductor 52 after transferring of the visible image to the paper P.

The photoconductor 52 rotates in a direction indicated by the arrow $R_1$ in FIG. 5. The imaging unit 51 charges the surface of the photoconductor 52 to a predetermined electric potential by the charging unit 53. The imaging unit 51 forms an electrostatic latent image on the photoconductor 52 by exposing the photoconductor 52 charged to a predetermined electric potential by an exposure unit which is not illustrated based on image data read by the image reading unit 14 or the image data transmitted by the computers 26a to 26c. The imaging unit 51 supplies a developing agent, specifically a toner, from the development sleeve of the development unit 54 to the electrostatic latent image formed on the photoconductor 52 to form a visible image. As described above, the imaging unit 51 repeats the charging, development, transfer, and cleaning on the photoconductor 52 to form a visible image with a toner on the conveyed paper P. A tonner in an amount corresponding to the toner consumed by the development is supplied to the development unit 54 at any time by a toner container (not illustrated) detachably provided in the imaging unit 51.

The multifunctional peripheral 11 has a fixing device 61 which fixes the visible image transferred by the imaging unit 51 to the paper P. The fixing device 61 contains a heating roller 62 which has a hollow state and is rotatable, a pressing roller 63 which has a solid state and is rotatable, a first heater 64a which mainly heats the central region of the heating roller 62, and a second heater 64b which mainly heats both end regions of the heating roller 62. The first and second heaters 64a and 64b are individually disposed in parallel to each other inside the heating roller 62.

The heating roller 62 has an approximately cylindrical shape and is configured from a metal raw tube. The pressing roller 63 abuts on the heating roller 62 which is configured from a rubber-like cylindrical member having elasticity. Specifically, the heating roller 62 and the pressing roller 63 are provided in such a manner that the surface of the heating roller 62 and the surface of the pressing roller 63 contact each other with a certain nip amount. Since the heating roller 62 and the pressing roller 63 contact each other, a certain amount of the heat of the heating roller 62 is transmitted to the pressing roller 63. More specifically, the temperature distributions of the heating roller 62 and the pressing roller 63 are almost the same.

The pressing roller 63 rotates in the direction indicated by the arrow $R_2$ in FIG. 5. The heating roller 62 rotates in a direction opposite to the rotation direction of the pressing roller 63. By the rotation of the heating roller 62 and the pressing roller 63, the paper P is conveyed from the upstream side to the downstream side. More specifically, the heating roller 62 and the pressing roller 63 also have a paper conveyance function of conveying the paper P. The fixing device 61 fixes the visible image formed by the toner on the paper P by heating and pressurization with the heating roller 62 and the pressing roller 63, respectively, in this conveyance.

The image forming unit 15 is provided with a conveyance belt 57 provided between the imaging unit 51 and the fixing device 61 and a plurality of paper feed rollers 58a, 58b, 58c, 58d, and 58e. For example, the paper P set to the manual feeding tray 28 is conveyed through paper conveyance paths 59a, 59b, 59c, and 59d by the paper feed rollers 58a to 58e to be discharged to the discharge tray 30. The paper P set in the paper feed cassettes 23a to 23c are conveyed through the paper conveyance paths 59b to 59d by the paper feed rollers 58b to 58e to be discharged to the discharge tray 30.

Next, a case where a user X forms an image using the multifunctional peripheral 11 according to one embodiment of the disclosure is described. In this case, the user X is supposed to be a non-skilled user under the age of 10. It is supposed that the user X performs copying using an image of the user's document.

Figure 6:
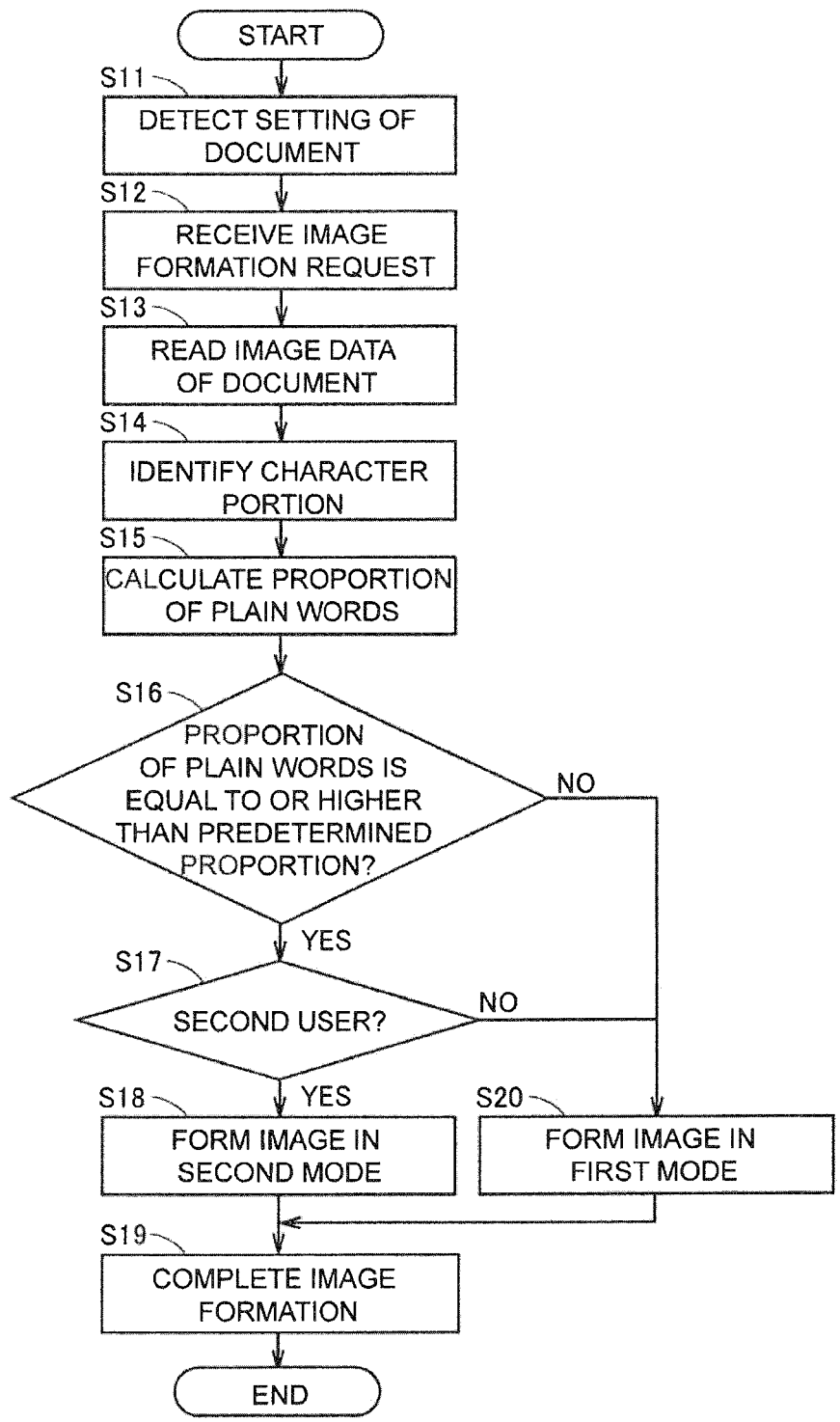
FIG. 6 is a flowchart showing the contents of processing when an image is formed using the multifunctional peripheral.

FIG. 6 is a flow chart showing the contents of processing when the user X forms an image using the multifunctional peripheral 11. With reference to FIG. 6, the user X goes to the front of the multifunctional peripheral 11, and then sets a document to the ADF 22. The control unit 12 detects the document set to the ADF 22 (Step S11 in FIG. 6, Hereinafter, the "step" is omitted.). The user X inputs image formation conditions from the display screen 21 or the like of the operation unit 13. Then, the user X depresses the start key 42 to request image formation. Then, the receiving unit 31 receives the image formation request (S12).

After the reception, the image reading unit 14 reads image data of the document utilizing the ADF 22 (S13). Herein, the character identification unit 35 discriminates a character portion from the image data of the read document (S14). In this case, for example, an OCR (Optical Character Recognition) mechanism provided therein is used. Then, the character identification unit 35 extracts a portion containing the plain words about the identified character portion. Thereafter, the character identification unit 35 calculates the proportion of the plain words in all the characters (S15).

It is judged whether or not the proportion of the plain words is equal to or higher than a predetermined proportion, e.g., 80% (S16). When it is judged that the proportion of the plain words is 80% or more of all the characters (YES in S16), the discrimination unit 32 estimates that, when the proportion is higher than 80%, the user requesting the image formation by the receiving unit 31 is the second user. Then, the user input unit 34 first inquires the age on the display screen 21 of the operation unit 13, before the user X requesting the image formation is discriminated as the second user (S17).

Figure 7:
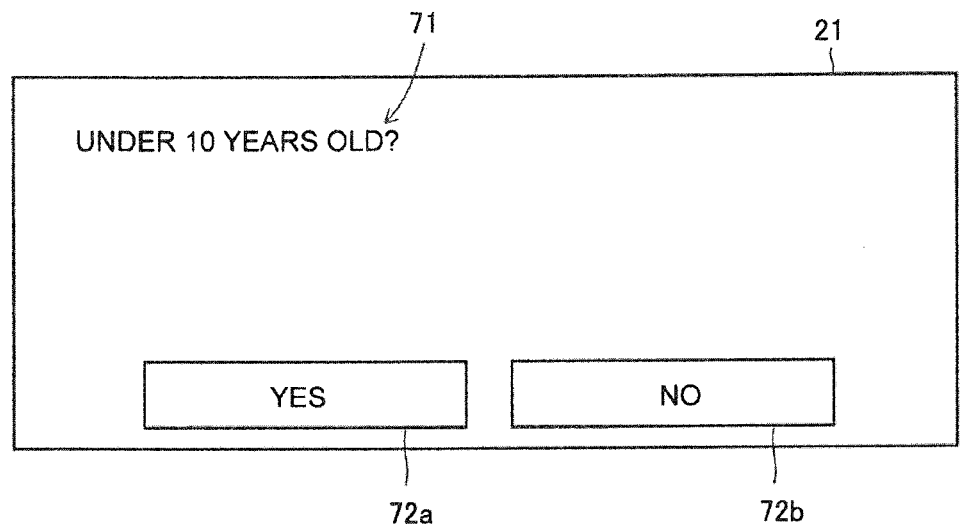
FIG. 7 is a view illustrating an example of an inquiry display screen.

FIG. 7 is a view illustrating an example of the display screen 21 in this case. With reference to FIG. 7, the display screen 21 displays an inquiry message 71 "Are you under 10 years old?", a selection key 72a in which "Yes" is indicated and which decides that the user X is the second user, and a selection key 72b in which "No" is indicated and which decides that the user X is the first user. In this case, the message 71 is indicated with the plain words supposing that it is used for children. In this embodiment, it is discriminated whether or not the user is a child based on whether or not the age of the user is under 10 years old. The age for discriminating whether or not the user X is a child is arbitrarily set.

Since the user X is under 10 years old, the user X depresses the selection key 72a. By detecting the depression of the selection key 72a, the discrimination unit 32 discriminates that the user X is the second user (YES in S17).

When the user X is discriminated as the second user, the mode setting unit 33 operates the image forming unit 15 in the second mode to form an image (S18). Specifically, the image formation speed is made lower than the usual speed, i.e., the speed in the first mode. When the image formation speed is made low, the number of sheets on which an image can be formed per unit time decreases. However, a risk of paper jam and the like can be reduced. More specifically, more reliable image formation can be achieved.

While the second mode is being set, when a paper jam occurs, the lock mechanism 67 is operated. Then, the opening of a cover 66 is not permitted until predetermined time passes. More specifically, in the second mode, when the paper jam is detected, the lock mechanism 67 is operated for a predetermined period of time.

Figure 8:
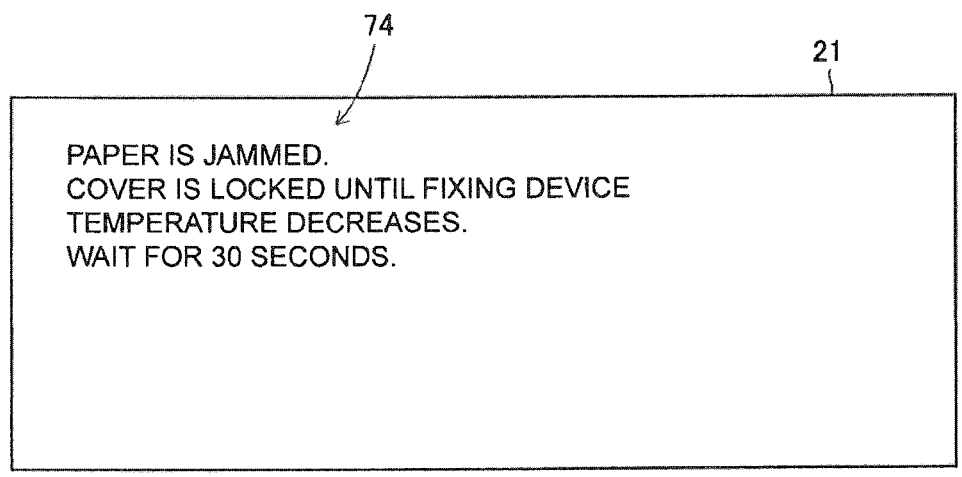
FIG. 8 is a view illustrating an example of a display screen when a paper jam occurs.

FIG. 8 is a view illustrating an example of the display screen 21 in this case. With reference to FIG. 8, the display screen 21 displays a message 74 "Paper is jammed. Cover is locked until fixing device temperature decreases. Wait for 30 seconds.". It is a matter of course that the message 74 is indicated with the plain words without using difficult words which children cannot understand also in this case.

The user X sees the message of the display screen 21 when the paper jam occurs, and then stands by for 30 seconds. Then, the lock mechanism 67 is released. Then, the user X opens the cover 66, and then removes the paper causing the paper jam out of the paper conveyance path. In this case, the fixing device 61 heated to a high temperature is cooled in 30 seconds. Therefore, when the user X removes the jammed paper, a risk of touching the hot portion can be considerably reduced. After removing the paper, the user X closes the cover 66, and then continuously performs image formation.

Thus, the image formation is completed (S19). The user X obtains copied paper.

According to such a multifunctional peripheral 11, it is discriminated whether a user requesting image formation is the first user or the second user with lower skill level. When the user is discriminated as the second user, the mode is set to the second mode in which image formation is more reliably performed on paper than in the first mode, and then the image forming unit 15 is operated. Thus, when the second user with a low skill level performs image formation, a risk that a paper jam may arise is reduced, so that image formation can be more reliably performed. Therefore, the convenience of users can be improved.

In this case, when it is judged that the proportion of the plain words is equal to or higher than a predetermined proportion, it is discriminated whether a user is the first user who is aged 10 or older or the second user who is under 10 years old. Therefore, it can be more reliably discriminated whether the user is the first user or the second user.

Moreover, in this case, when the proportion of the plain words identified by the character identification unit is less than a predetermined proportion, the user is discriminated as the first user. Therefore, it can be more reliably discriminated whether the user is the first user or the second user.

In S16, when the proportion of the plain words is less than 80% (NO in S16) and when the selection key 72*b* is depressed in FIG. 7, the mode setting unit 33 sets the mode to the first mode to operate the image forming unit 15 to form an image (S20). Then, the image formation is completed (S19).

In the embodiment described above, it is configured so that, when the proportion of the plain words occupying all the characters identified by the character identification unit 35 is equal to or higher than a predetermined proportion, the age is inquired for discriminating whether a user is the first user or second user. However, the disclosure is not limited to the embodiment and it may be discriminated whether a user is the first user or the second user based on only the proportion of the plain words in all the identified characters instead of inquiring the age. Alternatively, it may be configured so that the age is inquired irrespective of characters, and then it is discriminated whether a user is the first user or the second user based on the inquiry results.

Alternatively, it may be discriminated whether a user is the first user or the second user based on not only the proportion of the plain words occupying all the characters but the fact that the identified characters are indicated with the plain words, the proportion of the plain words, and the like. Alternatively, a user may be discriminated as the second user when the identified characters include characters from which the user can be specified as a child, e.g., Elementary school name, Homework, Japanese Language, Arithmetic, and Excursion. Alternatively, a user may be discriminated as the second user when image data of a read document includes animation images and game images for children without being limited to characters.

In the embodiment described above, the multifunctional peripheral 11 may be configured to have an image pick-up camera 82 as a photographing unit (also referred to as a "photographer") capable of photographing the figure of a user standing in front of the operation unit 13 and an analysis unit 83 (also referred to as an "analyzer") capable of analyzing the age of a user photographed by the image pick-up camera 82. The image pick-up camera 82 photographs the figure, particularly the face or the upper half of the body, of a user standing in front of the multifunctional peripheral 11 when a certain operation is performed by the operation unit 13. The photographed image is analyzed by the analysis unit 83, and then the user may be discriminated as the second user as a child with a low skill level from the height and the like of the user.

Figure 9:
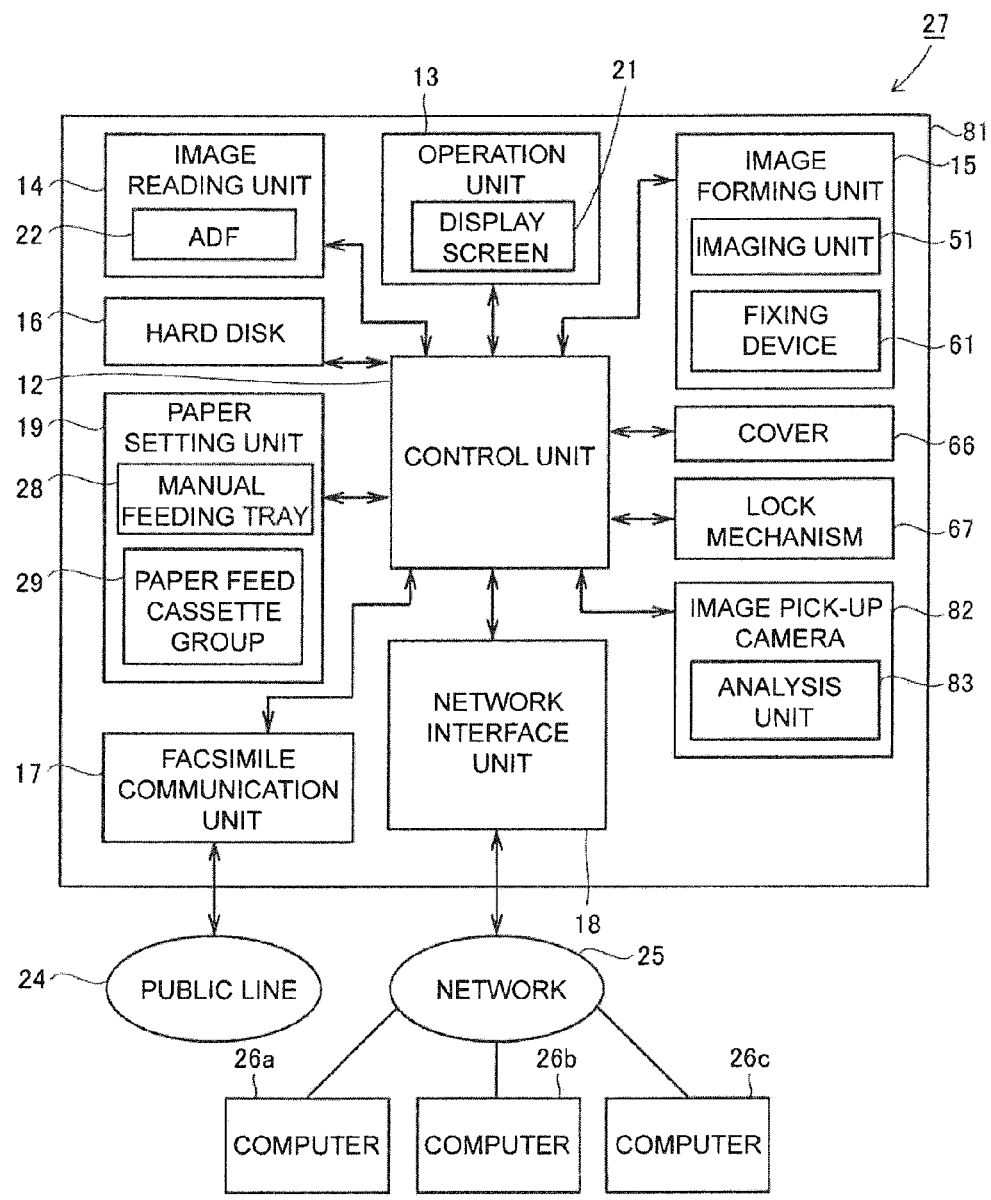
FIG. 9 is a block diagram illustrating the configuration of a multifunctional peripheral when an image forming apparatus according to another embodiment of the disclosure is applied to the multifunctional peripheral.

FIG. 9 is a block diagram illustrating the configuration of a multifunctional peripheral when an image forming apparatus according to another embodiment of the disclosure is applied to the multifunctional peripheral. With reference to FIG. 9, a multifunctional peripheral 81 according to another embodiment of the disclosure has the image pick-up camera 82 as a photographing unit. The image pick-up camera 82 contains the analysis unit 83 which analyzes the age of a user from the height and the like of the user photographed by the image pick-up camera 82 therein. The other configurations of the multifunctional peripherals 81 are the same as those of the multifunctional peripheral 11 illustrated in FIG. 2, and therefore a description thereof is omitted. Thus, it can be discriminated whether the user is the first user or the second user by analyzing the age of the user the analysis unit 83.

In the embodiment described above, when a request of image formation is received from the computers 26*a* to 26*c* connected to the network 25, a user performing the image formation request received from a certain specific computer 26*c* may be discriminated as the second user. More specifically, the receiving unit 31 receives image formation requests from the plurality of computers 26*a* to 26*c* connected to the multifunctional peripheral 11. Then, the discrimination unit 32 may be configured so that, when an image formation request from a predetermined computer 26*c* is received, the discrimination unit 32 discriminates that a user requesting the image formation from the predetermined computer 26*c* is the second user. Thus, when the computer 26*c* is disposed in a child's room, for example, more appropriate discrimination can be achieved.

In the embodiment described above, when a user is discriminated as the second user, the user needs to wait for 30 seconds when a paper jam occurs. However, the disclosure is not limited to the embodiment, and a configuration may be acceptable in which a first user receiving a request from the second user releases the lock in the lock mechanism 67, so that the first user can eliminate the paper jam.

Figure 10:
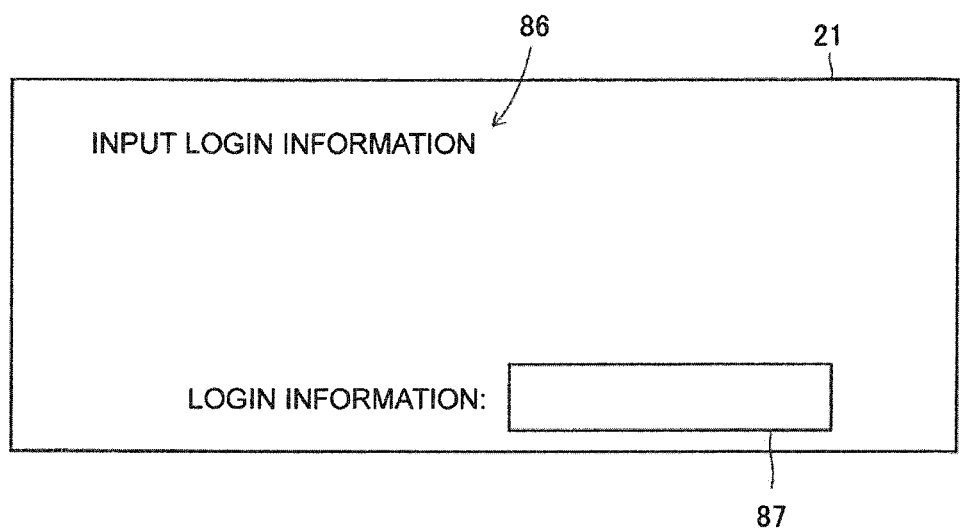
FIG. 10 is a view illustrating an example of a display screen which allows a user to input login information.

FIG. 10 is a view illustrating an example of the display screen 21 of the operation unit 13 in this case. With reference to FIG. 10, the display screen 21 displays a message 86 "Input login information" and a login information input unit 87 (also referred to as a "login information inputter") which allows a user to input login information.

The first user, e.g., a so-called an adult user, tries to immediately eliminate a paper jam in response to the request from the second user. At this time, the first user inputs his/her login information by the login information input unit 87. Then, the lock in the lock mechanism 67 is released. Then, the cover 66 is immediately opened by the first user, and then the jammed paper is removed. Thus, image formation can be re-started without the necessity of waiting for 30 seconds.

In the embodiment described above, the image forming apparatus has a notification unit (also referred to as a "notifier") so that, when continuous image formation in the image forming unit 15 cannot be performed in the second mode, the state is notified. Specifically, the state refers to a case where paper is exhausted or toner is exhausted. In this case, the notification unit notifies the state by the display by the display screen 21 or a sound. Thus, image formation can be immediately re-started through the input of the login information in the login information input unit 87 and the like. It may be configured so that, when the first user is not found around the second user, for example, the second user can select whether or not image formation is performed in a range where the image formation can be performed by the second user.

In the embodiment described above, the age of 10 years old is set as the age as the threshold between the first user and the second user but other ages may be set without being limited thereto.

In the embodiment described above, when the proportion of the plain words occupying all the characters is higher than a predetermined proportion, a user requesting image formation by the receiving unit 31 is estimated to be the second user. However, the disclosure is not limited to the embodiment and, when the proportion of characters having a size larger than a predetermined size occupying all the characters is higher than a predetermined proportion, a user requesting image formation by the receiving unit 31 may be estimated to be the second user.

The embodiments and examples as disclosed herein should be understood to be illustrative in all respects and not restrictive in any aspect. The scope of the disclosure is specified not by the foregoing description but by Claims, and all alternations that come within the meaning and range of equivalency of Claims are to be embraced within its scope.

The image forming apparatus according to the disclosure is particularly effectively used when an improvement of who is less skilled in an operation of the image forming apparatus of users is required.

What is claimed is:

1. An image forming apparatus for forming an image on paper, the image forming apparatus comprising:
    an image former that forms an image on paper based on image data in either a first mode or a second mode in which image formation is more reliably performed than in the first mode; and
    a controller configured to control the image forming apparatus, and configured to execute:
        a receiver that receives an image formation request from a user,
        a discriminator that discriminates whether the user requesting the image formation by the receiver is a first user or a second user who is less skilled in an operation of the image forming apparatus than the first user, and
        a mode setter that sets a mode to the second mode to operate the image former, when the discriminator discriminates that the user requesting image formation is the second user,
    wherein the discriminator contains a character identifier that identifies a character from the image data, and the discriminator discriminates whether the user requesting the image formation by the receiver is the first user or the second user based on a character identified by the character identifier.

2. The image forming apparatus according to claim 1, wherein the discriminator discriminates that the user requesting the image formation by the receiver is the second user when a proportion of plain words in all characters identified by the character identification unit identifier is higher than a predetermined proportion.

3. The image forming apparatus according to claim 1, comprising:
    a user inputter which allows a user to input that the user is the first user or the second user,
    wherein the discriminator discriminates whether the user requesting the image formation by the receiver is the first user or the second user according to data input by the user inputter.

4. The image forming apparatus according to claim 1, wherein image formation speed in the second mode is lower than image formation speed in the first mode.

5. The image forming apparatus according to claim 1 comprising:
    a photographer that photographs the user; and
    an analyzer that analyzes an age of the user photographed by the photographer,
    wherein the discriminator discriminates whether the user requesting the image formation by the receiver is the first user or the second user from the age of the user analyzed by the analyzer.

6. The image forming apparatus according to claim 1, wherein
    the receiver receives image formation requests from a plurality of computers connected to the image forming apparatus, and
    the discriminator discriminates that, when an image formation request from a predetermined computer of the computers is received, the user requesting the image formation from the predetermined computer is the second user.

7. The image forming apparatus according to claim 1 comprising:
    a cover configured to open for removing paper jammed when a paper jam occurs; and
    a lock mechanism which locks an opening of the cover,
    wherein the second mode operates the lock mechanism for a predetermined time of a period when the paper jam is detected.

8. The image forming apparatus according to claim 7 comprising:
    a login information inputter which allows the first user to input login information from the first user,
    wherein the image former releases a lock in the lock mechanism when the login information input by the login information inputter is correct.

9. The image forming apparatus according to claim 1 comprising:
    a notifier that notifies, when continuous image formation in the image former cannot be performed in the second mode, continuous image formation in the image former cannot be performed.

10. An image forming apparatus for forming an image on paper, the image forming apparatus comprising:
    an image former configured to form an image on paper based on image data in either a first mode having a first image formation criteria or a second mode having a second image formation criteria that is different from the first image formation criteria; and a controller configured to control the image forming apparatus, and configured to execute:
- a receiver configured to receive an image formation request from a user,
- a discriminator configured to discriminate whether the user requesting the image formation by the receiver is a first user associated with the first image formation criteria or a second user associated with the second image formation criteria, and
- a mode setter configured to set a mode to the second mode to operate the image former, when the discriminator discriminates that the user requesting image formation is the second user, wherein the discriminator contains a character identifier configured to identify a character based on the image data, and the discriminator is further configured to discriminate whether the user requesting the image formation by the receiver is the first user or the second user based on the character identified by the character identifier.

11. The image forming apparatus according to claim 10, wherein the discriminator discriminates that the user requesting the image formation by the receiver is the second user when a proportion of plain words in all characters identified by the character identifier is higher than a predetermined proportion.

12. The image forming apparatus according to claim 10, comprising:
a user inputter configured to receive an input that the user is the first user or the second user,
wherein the discriminator discriminates whether the user requesting the image formation by the receiver is the first user or the second user according to data input by the user inputter.

13. The image forming apparatus according to claim 10, wherein image formation speed in the second mode is lower than image formation speed in the first mode.

14. The image forming apparatus according to claim 10, comprising:
a photographer that photographs the user; and
an analyzer that analyzes an age of the user photographed by the photographer,
wherein the discriminator discriminates whether the user requesting the image formation by the receiver is the first user or the second user from the age of the user analyzed by the analyzer.

15. The image forming apparatus according to claim 10, wherein
the receiver configured to receive image formation requests from a plurality of computers connected to the image forming apparatus, and
the discriminator discriminates that, when an image formation request from a predetermined computer of the computers is received, the user requesting the image formation from the predetermined computer is the second user.

16. The image forming apparatus according to claim 10, comprising:
a cover configured to open for removing paper when a paper jam occurs; and
a lock mechanism which locks an opening of the cover,
wherein the second mode operates the lock mechanism for a predetermined time of a period when the paper jam is detected.

17. The image forming apparatus according to claim 16, comprising:
a login information inputter configured to receive login information from the first user,
wherein the image former releases a lock in the lock mechanism when the login information input by the login information inputter is correct.

18. The image forming apparatus according to claim 10, comprising:
a notifier that notifies, when continuous image formation in the image former cannot be performed in the second mode, continuous image formation in the image former cannot be performed.

* * * * *